Patented May 14, 1935

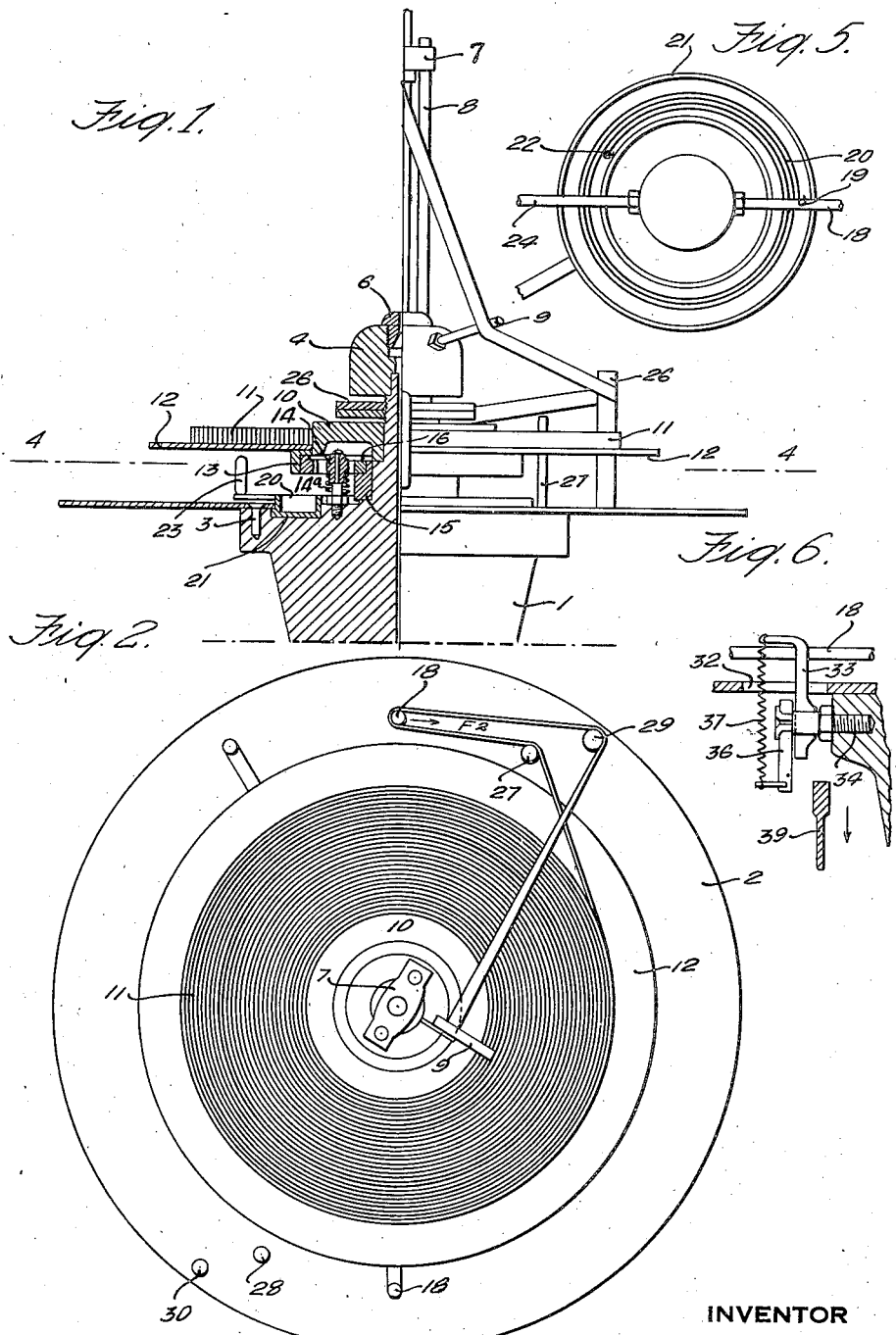

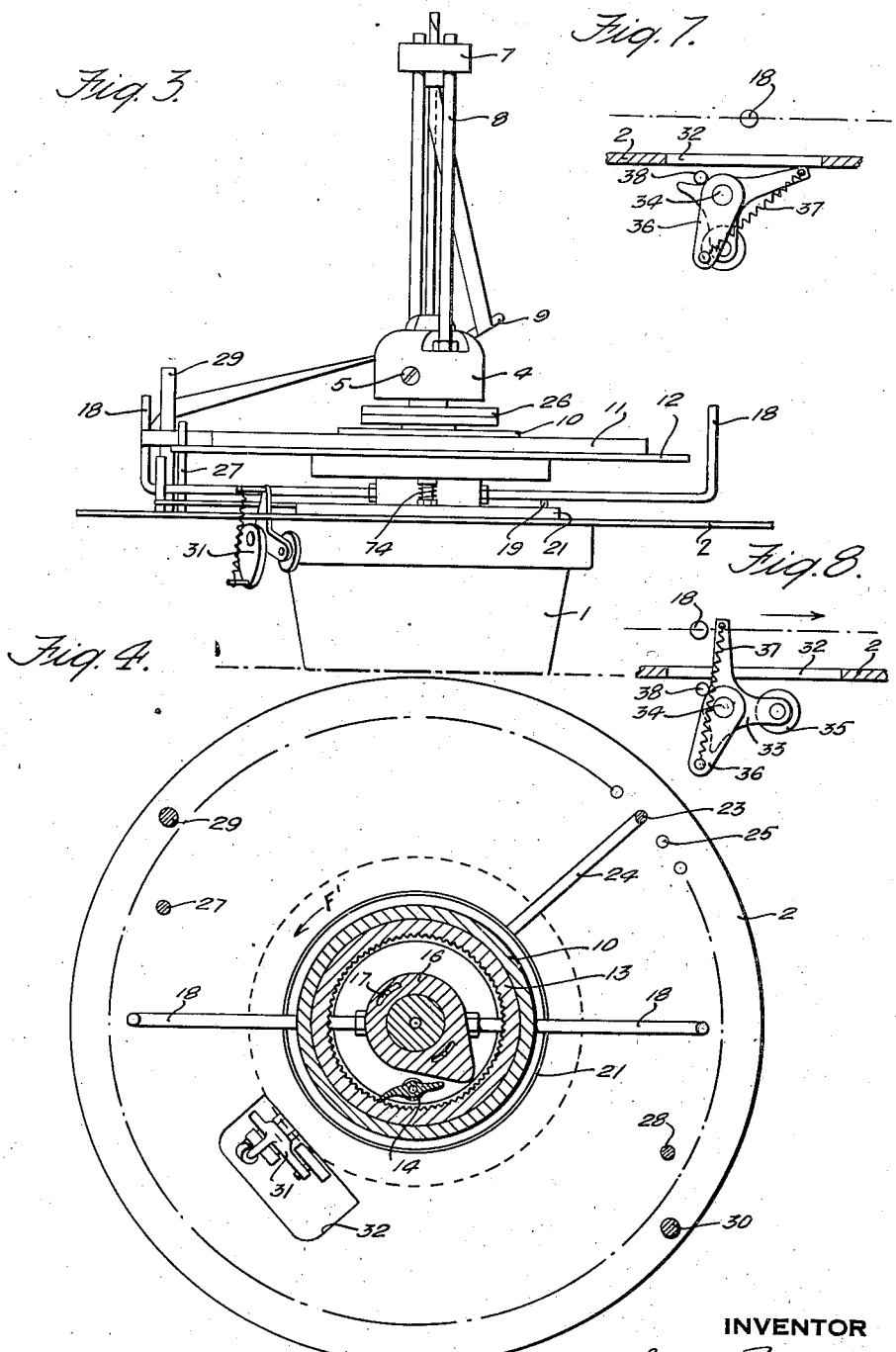

2,001,546

UNITED STATES PATENT OFFICE 2,001,546

MACHINE FOR COVERING ELECTRICAL WIRES OR TAPES

Gaston Pourtier, Romainville, France

Application September 30, 1931, Serial No. 566,108
In France September 30, 1930

4 Claims. (Cl. 117—45)

The apparatus commonly used for covering the electrical wires and cables show the following drawbacks:

The tension is irregular and difficult to control;
It is difficult to provide the same tension on identical apparatus;
The apparatus are not automatic and, particularly, they miss an automatic stoppage when the material being applied tears off;
The apparatus turn at slow speed.

The objects of this invention are improvements in or to said apparatus in order to overcome these drawbacks.

The apparatus according to the invention rests on following principle:

The spool of material is placed on the apparatus so that it can unwind only when the required tension is attained. If for any reason this tension decreases during a short moment, the feeding spool becomes blocked until the normal tension is restored. As, on the other hand, the device frees entirely the spool as soon as the tension exceeds the desired value, the latter recovers automatically and immediately the suitable value. In operation the system becomes stabilized between a minimum and a maximum tension which are extremely close and these limits of tension are absolutely constant throughout the duration of the operation.

As soon as the material to be applied tears off, the tension drops to nought and the device immediately stops the machine.

An essential feature of the device employed is that it is not influenced by centrifugal force. Its operation rests upon this feature, permitting the apparatus to rotate at a great angular speed.

The operation of the apparatus will be best understood by reference to accompanying drawings. On said drawings:

Fig. 1 is an elevation, half in section, of the apparatus according to the invention;

Fig. 2 is a plan view of said apparatus showing the tape of material as it presents itself during operation;

Fig. 3 is an elevation taken at 90° as compared with Fig. 1;

Fig. 4 is a plan section of the apparatus along 4—4 of Fig. 1;

Fig. 5 shows the control spring device;

Figs. 6, 7 and 8 show the arrangement of the secondary members which provide for the automatic stoppage.

The apparatus comprises a body 1 acting as a spindle (Figs. 1 and 2) rotated by means of mechanism (not shown); said body is provided with a central bore giving passage to the wire to be covered and supports a disc 2 secured thereto as by screws 3.

On the other hand a member 4 is fixed upon the body 1 by means of a tightening screw 5 and is provided with an interchangeable member 6 of predetermined bore. A die 7 also of predetermined bore slides up and down two rods 8 secured upon member 4 upon which is also secured a finger 9 which guides the covering tape.

The covering material is, in the case of Fig. 1, wound up as a reel 11 upon a bushing 10 with which said reel rotates as it rests upon a disc 12 provided upon said bushing.

The latter rotates quite freely upon an extension of spindle 1 and is provided with an internal toothed crown wheel 13 (Figs. 1 and 4) secured upon said bushing by means of pressure screws (not shown).

A pawl 14 is adapted to oscillate about a stud secured to member 1 and an helical spring 14a tends to maintain constantly said pawl in engagement with the gear 13. When in that position, the pawl prevents rotation of bushing in the direction of arrow F' (Fig. 4).

A ring 15 is provided with a cam 16 the angular position of which is controlled by means of pins 17a secured in the spindle or body 1 and engaging in slots 17 in the ring. Said ring is adapted to rotate freely on spindle 1. Two rods 18 are secured onto ring 15 and pivot thus with said ring about the axis of the apparatus taken as a center.

Members 15, 16 and 18 as a whole may be called the regulator. A pin 19 (Fig. 5) fixed upon one of the rods 18 is secured at one of the ends of a spiral spring 20, placed inside of an annular box 21 adapted to rotate about the axis of the apparatus while it moves in a circular groove provided in spindle 1 (Fig. 1), the other end of said spiral spring being secured to said box by means of a pin 22 (Fig. 5).

The spring 20 may be wound up by turning box 21 a suitable number of turns by means of a pin 23 (Fig. 4), secured to box 21 by means of a flexible rod 24 tending to keep the lower end of pin 23 engaged in holes 25 pierced on the entire periphery of disc 2 four of which are shown and the remainder are indicated by a dot-dash line. Spring 20 may thereby be wound up and adjusted to produce a large number of different tensions.

Two threaded washers 26 are mounted upon the extension of the spindle 1 to hold the bushing 10 in place thereon (see Fig. 1).

The operation is as follows:

The tape 11, as it unwinds from the reel, passes about a vertical pin 27 fixed to the disc 2 and then about the movable rod 18. From this rod the tape passes about the pin 29 also fixed to the disk 2 and thence under the rod 9 and from this rod passes to the wire when it is wound thereon adjacent the die 7. Two sets of pins 27, 29 and 28, 30 are provided, these sets corresponding respectively to the two rods 18. From there, the tape passes over rod 9 and winds finally upon the wire in the vicinity of die 7.

The apparatus being started, the whole system rotates at the beginning at the same speed as spindle 1 and the tape winds upon the wire. As pawl 14 is engaged, the bushing 10 and the tape reel do not rotate in relation to spindle 1. The length of the tape decreases on account of its winding upon the wire; its tension increases and rod 18 is urged to turn about the axis in the direction of the arrow $F^2$ (Fig. 2). At that time, cam 16 which moves with rod 18, disengages pawl 14 (Fig. 4); the sleeve and the reel become then free and some of the tape unwinds due to the action of rod 18 under control of spiral spring 20 which urges the tape in the direction opposite to arrow $F^2$. Cam 16 disengages then pawl 14 which blocks again the sleeve and so on.

It is clear that rod 18 controls the tension of the tape by means of cam 16 and pawl 14 which frees the bushing tooth after tooth, allowing the amount of tape exactly sufficient to keep the tension substantially constant whatever the feed required for winding the tape upon the wire may be.

The tension of the tape is in direct ratio to the strain of spring 20. It is only necessary to gauge said spring to obtain immediately the required tension of the tape, by adjusting the box by engagement of pin 23 within one of the holes 25 of disc 2.

If the tape breaks, rod 18 is violently thrown back, in the reverse direction of arrow $F^2$ (Fig. 2), under the action of spiral spring 20 and causes the operation of the automatic disengagement mechanism 31 shown in detail on Figures 6, 7 and 8.

Figure 8 shows the system in normal working position.

An opening 32 in disc 2 enables a bell crank 33 to engage rod 18.

Said bell crank pivots about a stud 34 and bears a roller 35.

An arm 36 secured to the stud 34 has attached to it a spring 37 attached on the other hand to the other end of the bell crank. An abutment 38 limits the throw of roller 35.

In the position shown on Figure 8, spring 37 maintains bell crank 33 in its position in engagement with abutment 38, the spring then being located upon the left-hand side, Figs. 7 and 8, of the axis of the stud 34. If, on account of the rupture of the tape, rod 18 strikes said bell crank, the bell crank is swung into a position to carry the spring to the right, Figs. 7 and 8, of the axis of stud 34 and the spring then swings said bell crank into the position shown in Fig. 7. An abutment 38, which is located in position to engage the crank arm when the latter is in either of the positions shown in Figs. 7 and 8, limits the extent of movement of the roller 35 in either direction. While I have shown the stop device 39 broken away, it will be understood by those skilled in the art that this is the operating or control arm of any suitable stop mechanism, many of which are commonly known and used.

The principal members of the apparatus are preferably made of relatively light metal in order to minimize the inertia forces.

Said device can be used as well for covering a wire or cable with a thread or with threads as with a tape or tapes.

What I claim is:

1. In a wire-covering machine a rotatable winding head, a device for supporting a coil of covering material mounted to rotate coaxially with said head and driven thereby and also rotatable relatively to said head, a tension controlling device mounted for movement substantially about the axis of said head and having a guide for engagement with the material being wound, a pawl for holding said supporting device from rotation relatively to said head, a throw-out device movable with the guide for disengaging the pawl and a spiral spring surrounding the axis of rotation for controlling said guide.

2. In a wire-covering machine a rotatable winding head, a device for supporting a coil of covering material mounted for rotation co-axially with said head and also rotatable relatively to said head, a tension device comprising an oscillatory guide mounted for movement substantially about the axis of said head, a support for said guide, holding means for holding said coil supporting device from rotation relatively to said head, a throw-out device movable with the guide for disengaging said holding means and a spring for controlling said guide.

3. In an electrical wire-covering machine, the combination of a rotatable winding head adapted to feed wire covering material from a roll thereof, a movable member mounted on said winding head for movement with respect to said head about the axis of rotation of said head, and held in its normal position by the covering material being fed from the roll, spring means adapted to move said movable member to another position when it is released by breakage or exhausting of the covering material, and means operated upon by said movable member in said latter position adapted, when so operated upon, to move to a position in which it will engage a stopping device positioned close to the path of rotation thereof, and adapted, when moved in the direction of rotation thereof, to stop the rotation of said winding head.

4. In a wire-covering machine, a rotatable winding head, a device rotatably supported on said winding head adapted to carry a coil of covering material, a spring-pressed arm adapted to engage a loop of the covering material and resiliently movable to substantially lengthen or shorten said loop with slight changes in tension inserted thereon, whereby to take up and subsequently feed back slack in the covering material without significant changes in tension of the feed, and means responsive to movement of said arm in a direction to lengthen said loop for restraining the relative rotation between the winding head and the coil-carrying device, said means adapted for taking up slack being mounted for movement about the axis of rotation of the winding head, in substantial dynamic balance thereon, whereby its portion is substantially unaffected by the speed of rotation of said winding head.

GASTON POURTIER.